US012645741B2

(12) United States Patent
Zeng et al.

(10) Patent No.: US 12,645,741 B2
(45) Date of Patent: Jun. 2, 2026

(54) DISTRIBUTED SAMPLE SELECTION WITH SELF-LABELING

(71) Applicant: IRON MOUNTAIN INCORPORATED, Boston, MA (US)

(72) Inventors: Zhihong Zeng, Acton, MA (US); Zhi Chen, Montreal (CA); Meena Abdelmaseeh Adly Fouad, Mississauga (CA); Narasimha Goli, Tampa, FL (US)

(73) Assignee: Iron Mountain Incorporated, Portsmouth, NH (US)

( * ) Notice: Subject to any disclaimer, the term of this patent is extended or adjusted under 35 U.S.C. 154(b) by 217 days.

(21) Appl. No.: 18/176,922

(22) Filed: Mar. 1, 2023

(65) Prior Publication Data

US 2023/0315790 A1     Oct. 5, 2023

Related U.S. Application Data

(60) Provisional application No. 63/315,397, filed on Mar. 1, 2022.

(51) Int. Cl.
*G06F 16/906* (2019.01)
*G06F 16/93* (2019.01)

(52) U.S. Cl.
CPC ............ *G06F 16/906* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 2006/0112040 A1* | 5/2006 | Oda | G06F 16/355 707/E17.08 |
| 2008/0071708 A1* | 3/2008 | Dara | G06F 18/23 706/20 |
| 2009/0043797 A1* | 2/2009 | Dorie | G06F 16/355 707/999.102 |
| 2011/0137898 A1* | 6/2011 | Gordo | G06F 16/93 707/E17.089 |
| 2012/0041955 A1* | 2/2012 | Regev | G06F 16/355 707/E17.089 |
| 2014/0052712 A1* | 2/2014 | Savage | G06F 3/0484 707/738 |
| 2021/0365735 A1* | 11/2021 | Abbeloos | G06V 10/774 |
| 2023/0229963 A1* | 7/2023 | Iyer | G06N 20/00 706/12 |

OTHER PUBLICATIONS

Asano, et al., "Self-Labelling Via Simultaneous Clustering and Representation Learning", Available online at: https://arxiv.org/abs/1911.05371, Feb. 19, 2020, 22 pages.

(Continued)

*Primary Examiner* — Neveen Abel Jalil
*Assistant Examiner* — John J Morris
(74) *Attorney, Agent, or Firm* — Kilpatrick Townsend & Stockton LLP

(57) ABSTRACT

In some embodiments, techniques for self-labeling to extract a representative set of samples from a large-scale set of unlabeled documents (e.g., a set that represents a distribution of the large-scale set) are provided. The samples of the representative set may then be used to classify the documents of the large-scale set.

20 Claims, 14 Drawing Sheets

(56) References Cited

OTHER PUBLICATIONS

He, et al., "Momentum Contrast for Unsupervised Visual Representation Learning", Available online at: https://arxiv.org/pdf/1911. 05722, Mar. 23, 2020, 12 pages.

Van Gansbeke, et al., "SCAN: Learning to Classify Images without Labels", Available online at: https://arxiv.org/pdf/2005.12320, Jul. 3, 2020, 26 pages.

* cited by examiner

900

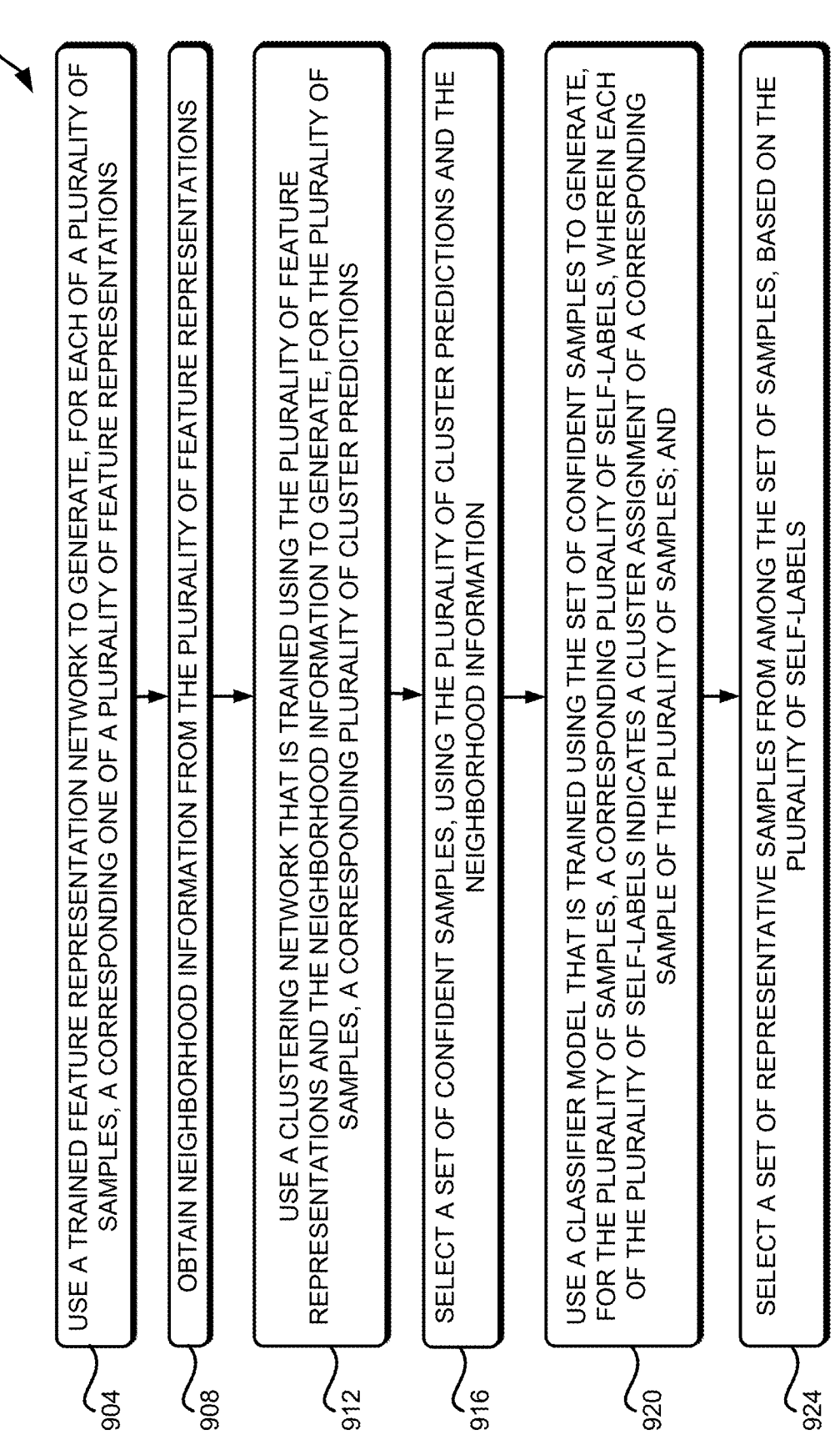

904 — USE A TRAINED FEATURE REPRESENTATION NETWORK TO GENERATE, FOR EACH OF A PLURALITY OF SAMPLES, A CORRESPONDING ONE OF A PLURALITY OF FEATURE REPRESENTATIONS

908 — OBTAIN NEIGHBORHOOD INFORMATION FROM THE PLURALITY OF FEATURE REPRESENTATIONS

912 — USE A CLUSTERING NETWORK THAT IS TRAINED USING THE PLURALITY OF FEATURE REPRESENTATIONS AND THE NEIGHBORHOOD INFORMATION TO GENERATE, FOR THE PLURALITY OF SAMPLES, A CORRESPONDING PLURALITY OF CLUSTER PREDICTIONS

916 — SELECT A SET OF CONFIDENT SAMPLES, USING THE PLURALITY OF CLUSTER PREDICTIONS AND THE NEIGHBORHOOD INFORMATION

920 — USE A CLASSIFIER MODEL THAT IS TRAINED USING THE SET OF CONFIDENT SAMPLES TO GENERATE, FOR THE PLURALITY OF SAMPLES, A CORRESPONDING PLURALITY OF SELF-LABELS, WHEREIN EACH OF THE PLURALITY OF SELF-LABELS INDICATES A CLUSTER ASSIGNMENT OF A CORRESPONDING SAMPLE OF THE PLURALITY OF SAMPLES; AND

924 — SELECT A SET OF REPRESENTATIVE SAMPLES FROM AMONG THE SET OF SAMPLES, BASED ON THE PLURALITY OF SELF-LABELS

FIG. 9

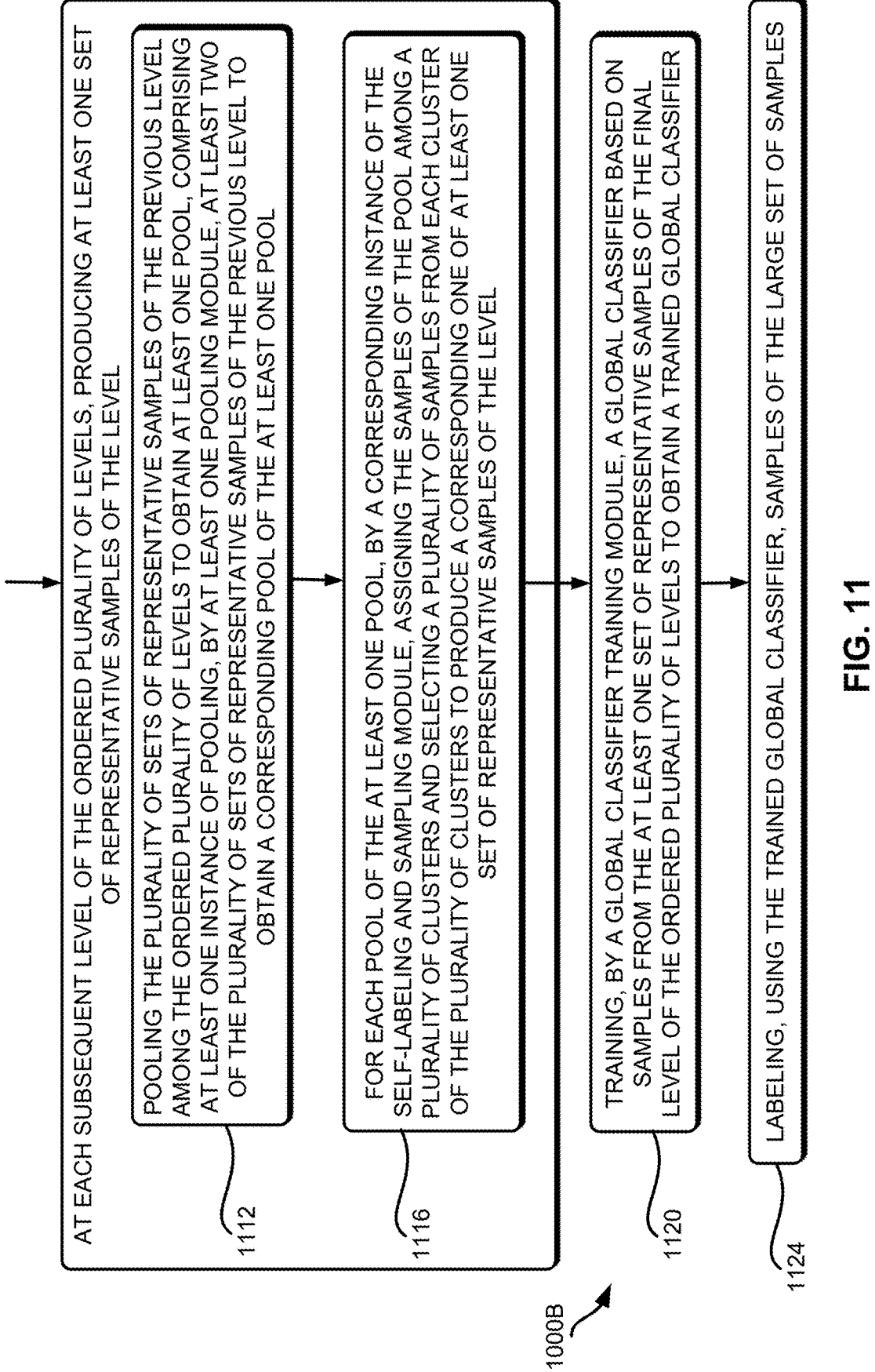

From 1008 in FIG. 10

AT EACH SUBSEQUENT LEVEL OF THE ORDERED PLURALITY OF LEVELS, PRODUCING AT LEAST ONE SET OF REPRESENTATIVE SAMPLES OF THE LEVEL

1112 — POOLING THE PLURALITY OF SETS OF REPRESENTATIVE SAMPLES OF THE PREVIOUS LEVEL AMONG THE ORDERED PLURALITY OF LEVELS TO OBTAIN AT LEAST ONE POOL, COMPRISING AT LEAST ONE INSTANCE OF POOLING, BY AT LEAST ONE POOLING MODULE, AT LEAST TWO OF THE PLURALITY OF SETS OF REPRESENTATIVE SAMPLES OF THE PREVIOUS LEVEL TO OBTAIN A CORRESPONDING POOL OF THE AT LEAST ONE POOL

1116 — FOR EACH POOL OF THE AT LEAST ONE POOL, BY A CORRESPONDING INSTANCE OF THE SELF-LABELING AND SAMPLING MODULE, ASSIGNING THE SAMPLES OF THE POOL AMONG A PLURALITY OF CLUSTERS AND SELECTING A PLURALITY OF SAMPLES FROM EACH CLUSTER OF THE PLURALITY OF CLUSTERS TO PRODUCE A CORRESPONDING ONE OF AT LEAST ONE SET OF REPRESENTATIVE SAMPLES OF THE LEVEL

1120 — TRAINING, BY A GLOBAL CLASSIFIER TRAINING MODULE, A GLOBAL CLASSIFIER BASED ON SAMPLES FROM THE AT LEAST ONE SET OF REPRESENTATIVE SAMPLES OF THE FINAL LEVEL OF THE ORDERED PLURALITY OF LEVELS TO OBTAIN A TRAINED GLOBAL CLASSIFIER

1124 — LABELING, USING THE TRAINED GLOBAL CLASSIFIER, SAMPLES OF THE LARGE SET OF SAMPLES

DISTRIBUTED SAMPLE SELECTION WITH SELF-LABELING

CROSS-REFERENCE TO RELATED APPLICATION

This application claims the benefit of U.S. Provisional Application No. 63/315,397, filed Mar. 1, 2022, and entitled DISTRIBUTED SAMPLE SELECTION WITH SELF-LABELING, the content of which is hereby incorporated by reference in its entirety for all purposes.

TECHNICAL FIELD

The field of the present disclosure relates to document processing. More specifically, the present disclosure relates to techniques for self-labeling of digital documents.

BACKGROUND

Supervised machine learning methods use labeled data to train a model. Such methods may be unsuitable for applications in which labeled data is not available.

SUMMARY

Certain embodiments involve using self-labeling to extract a representative set of samples from a large-scale set of unlabeled documents (e.g., a set that represents a distribution of the large-scale set). The samples of the representative set may then be used to classify the documents of the large-scale set.

A computer-implemented method includes using at least one processor to perform operations. The operations include using a feature representation network to generate, for each of a plurality of samples, a corresponding one of a plurality of feature representations. The operations also include obtaining neighborhood information from the plurality of feature representations. Additionally, the operations include using a clustering network that is trained using the plurality of feature representations and the neighborhood information to generate, for the plurality of samples, a corresponding plurality of cluster predictions. Further, the operations include selecting a set of confident samples using the plurality of cluster predictions and the neighborhood information. Furthermore, the operations include using a classifier model that is trained using the set of confident samples to generate, for the plurality of samples, a corresponding plurality of self-labels, wherein each of the plurality of self-labels indicates a cluster assignment of a corresponding sample of the plurality of samples. Moreover, the operations include selecting a set of representative samples from among the set of samples based on the plurality of self-labels.

A computer-implemented method includes using at least one processor to perform operations in an ordered plurality of levels, including a first level and at least one subsequent level including a final level. The operations include dividing, by a chunking module, a large set of samples into a plurality of chunks of samples and, at the first level of the ordered plurality of levels, producing a plurality of sets of representative samples of the first level. In the first level, the operations include, for each chunk of the plurality of chunks, by a corresponding instance of a self-labeling and sampling module, assigning the samples of the chunk among a plurality of clusters and selecting a plurality of samples from each cluster of the plurality of clusters to produce a corresponding one of the plurality of sets of representative samples of the first level. At each subsequent level of the ordered plurality of levels, the operations include producing at least one set of representative samples of the level. The operations at each subsequent level include pooling the plurality of sets of representative samples of the previous level among the ordered plurality of levels to obtain at least one pool. The pooling operation includes pooling, by at least one pooling module, at least two of the plurality of sets of representative samples of the previous level to obtain a corresponding pool of the at least one pool. Further, the pooling operation includes, for each pool of the at least one pool, by a corresponding instance of the self-labeling and sampling module, assigning the samples of the pool among a plurality of clusters and selecting a plurality of samples from each cluster of the plurality of clusters to produce a corresponding one of at least one set of representative samples of the level. The operations also include training, by a global classifier training module, a global classifier model based on samples from the at least one set of representative samples of the final level of the ordered plurality of levels to obtain a trained global classifier. Additionally, the operations include labeling, using the trained global classifier model, samples of the large set of samples.

A computer-implemented method obtains a set of documents that is representative of a large set of documents. The method includes at the first level of an ordered plurality of levels, dividing a large set of documents into a plurality of chunks. For each chunk of the plurality of chunks, the method includes training a corresponding instance of a clustering model on a training set of documents of the chunk, clustering the documents of the chunk, using the trained corresponding instance, into a plurality of clusters, and selecting a set of documents of the chunk that includes, for each of the plurality of clusters, a plurality of confident documents and a plurality of non-confident documents. Further, the method includes, at each of the second and subsequent levels of the ordered plurality of levels, pooling sets of documents from the previous level to obtain at least one pool. Additionally, the method includes, for each of the at least one pool, training a corresponding instance of a clustering model on a training set of documents of the pool, clustering the documents of the pool, using the trained corresponding instance, into a plurality of clusters, and selecting a set of documents of the pool that includes, for each of the plurality of clusters, a plurality of confident documents and a plurality of non-confident documents.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 9 shows a flowchart of a process 900 for self-labeling a set of samples, according to certain embodiments of the present disclosure.

FIGS. 10 and 11 show a flowchart of a process for labeling samples of a large set of samples, according to certain embodiments of the present disclosure.

DETAILED DESCRIPTION

Figure 1:
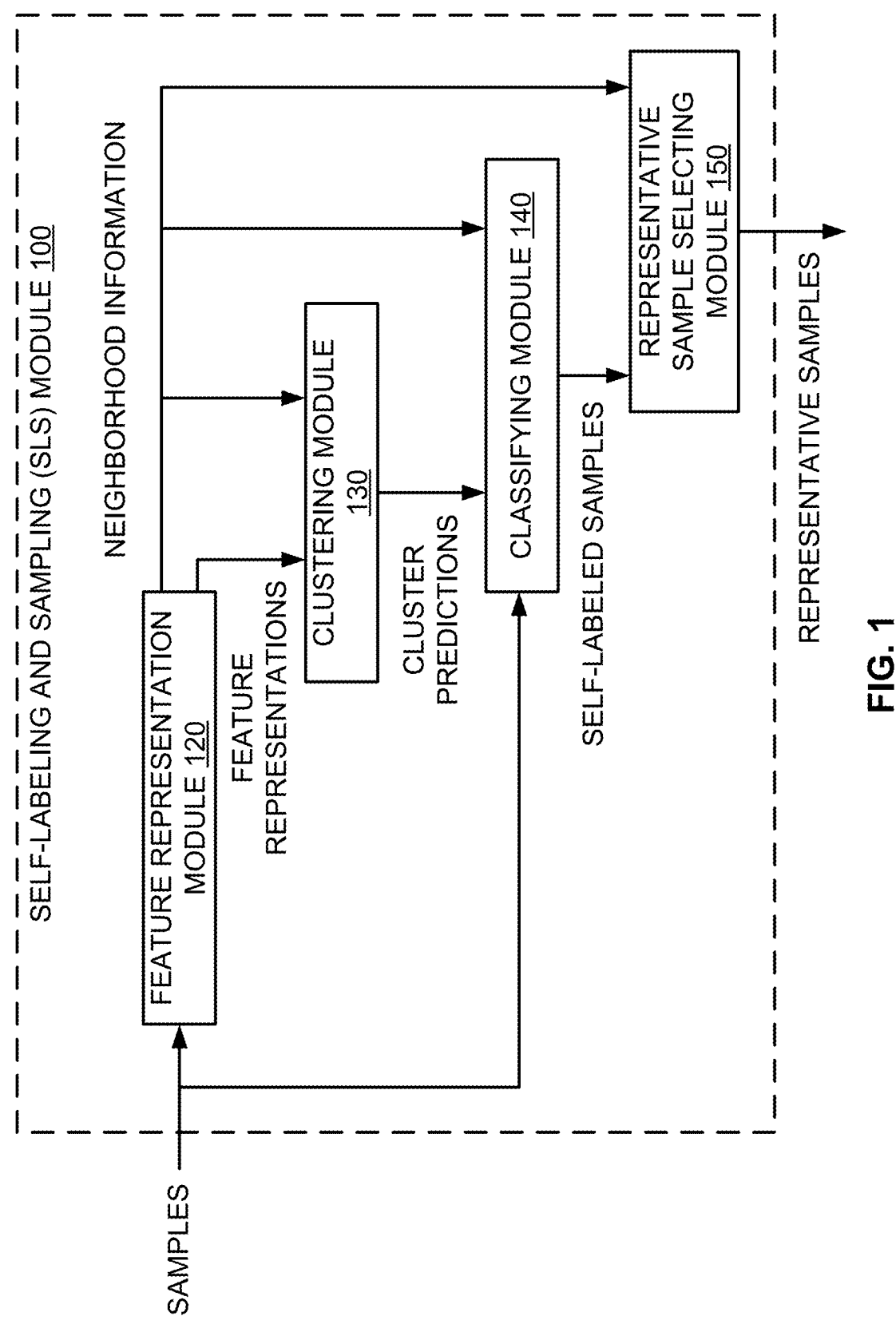
FIG. 1 depicts an example of a self-labeling and sampling (SLS) module according to certain embodiments of the present disclosure.

The subject matter of embodiments of the present disclosure is described here with specificity to meet statutory requirements, but this description is not necessarily intended to limit the scope of the claims. The claimed subject matter may be implemented in other ways, may include different elements or steps, and may be used in conjunction with other existing or future technologies. This description should not be interpreted as implying any particular order or arrangement among or between various steps or elements except when the order of individual steps or arrangement of elements is explicitly described.

In some cases, deep unsupervised learning methods for data self-labeling may be used to group data samples according to hidden structures, patterns, and features. Achieving an acceptable model accuracy with data self-labeling methods remains challenging, however, and it is difficult to achieve convergence of such methods during training. Existing self-labeling methods are also largely unsuitable for processing large-scale sets of unlabeled documents (e.g., on the order of ten thousand documents, or one hundred thousand or more documents), due to factors such as, for example, computing limitations (e.g., limits on the amount of GPU/CPU power, time, and/or memory that may be available).

Certain aspects and examples of the disclosure relate to self-labeling techniques for grouping samples (e.g., documents) into semantically consistent clusters in the absence of ground-truth labels. Such techniques may include a contrastive representation model for generation of document feature representations; neighborhood information exploitation to generate a clustering model; non-confident sample filtering (e.g., to avoid model training divergence); fine-tuning a clustering model with filtered samples along with penalty functions for clustering; a penalty function based on cluster probability for a sample (e.g., to stabilize self-labeling training to avoid, for example, divergence and/or training loss oscillation); and/or efficient hyper-parameter optimization (e.g., with warm-started Bayesian optimization). A self-supervised method may be used to train a clustering model using soft self-labels to avoid divergence, and non-confident sample filtering and/or penalty functions may be iterated to improve model performance and/or robustness.

A first step of preparing a large set of unlabeled data samples for labeling may be to select a subset of samples for analysis. A naive approach of random selection (e.g., each sample in the large set has the same probability of being selected for the subset) does not guarantee that the selected subset of samples will adequately represent a variation of data within the large set. For example, a subset of samples selected at random from a large set may underrepresent samples of a minority class within the large set, especially if the size of the minority class is small compared to the size of the large set.

Applications of self-labeling techniques to methods and architectures for distributed sample selection are also disclosed. For example, certain embodiments include a document processing system to process a large-scale set of unlabeled documents, using self-labeling to extract a representative set of samples from the large-scale set (e.g., a set that represents a distribution of the large-scale set). The samples of the representative set may then be used to classify the documents of the large-scale set. For example, samples of the representative set may be annotated with labels (e.g., by one or more human reviewers); the annotated labels may be used as ground truth for training a global classifier; and the trained global classifier may be used to label documents of the large-scale set. Examples of classes of documents within the large-scale set that may be represented by samples of the representative set may include any of, for example, "e-mail," "photograph," "purchase agreement," "security instrument," "amortization schedule," "driving license," etc. The document processing system may be implemented as a multi-level distributed system that includes a plurality of instances of a self-labeling and sampling (SLS) module, each instance being configured to receive and process a set of samples (e.g., a chunk of a large-scale set of documents) to produce a set of representative samples.

Referring now to the drawings, FIG. 1 is an example of a self-labeling and sampling (SLS) module 100 configured to receive and process an input set of samples (e.g., a chunk of a large-scale set of unlabeled documents, or a pool as described below) to produce a set of representative samples. In various embodiments, the SLS module (which may execute, for example, on one or more servers) includes a feature representation module 120, a clustering module 130, a classifying module 140, and a representative sample selecting module 150. Examples of document processing systems that include multiple instances of an SLS module, and of computing environments that include such document processing systems, are described below with reference to FIGS. 5-8.

As shown in the example of FIG. 1, a feature representation module 120 receives the set of samples and generates corresponding feature representations and neighborhood information. A clustering module 130 receives the feature representations and neighborhood information and generates corresponding cluster predictions. A classifying module 140 receives the samples, the cluster predictions, and the neighborhood information and produces self-labeled samples. A representative sample selecting module 150 receives the self-labeled samples and the neighborhood information and produces a set of representative samples.

Figure 2:
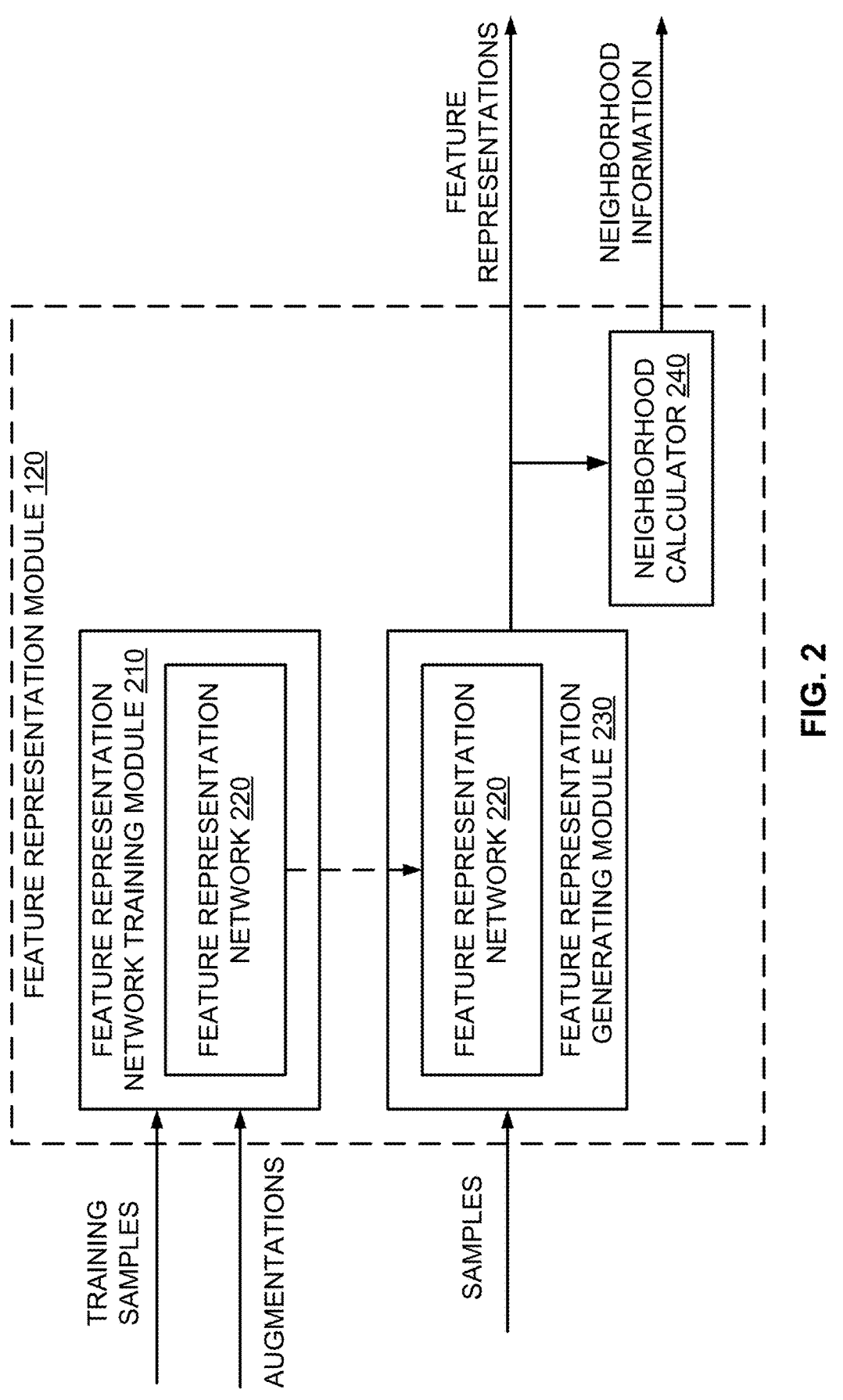
FIG. 2 shows an example of a feature representation module according to certain embodiments of the present disclosure.

FIG. 2 shows an example of an implementation of the feature representation module 120 that includes a feature representation network training module 210, a feature representation network training module 210, and a neighborhood calculator 240. The feature representation network training module 210 is configured to train a feature representation network 220 using a set of training samples and augmentations of the training samples. The feature representation network training module 210 is configured to use the trained feature representation network 220 (e.g., as trained by the feature representation network training module 210) to generate corresponding feature representations for samples of the set of samples. The neighborhood calculator 240 generates neighborhood information for the set of samples, based on the feature representations.

The training samples are drawn (e.g., at random) from the set of samples, which comprises documents that may be stored in a document format (e.g., PDF) and/or in an image format (e.g., TIFF)). Configurable parameters of the feature representation network training module 210 may include the number of training samples (for example, as a numerical value (e.g., in a range of from one hundred or two hundred to five hundred or one thousand) or as a proportion of the size of the input set of samples (e.g., in a range of five or ten percent to twenty-five or thirty percent)). The training data used by the feature representation network training module 210 to train the feature representation network 220 also includes augmentations of the training samples. The augmentations may be generated from the training samples (e.g., by another module of the SLS module 100 or by another module of the feature representation module 120 (not shown)) by any one or more of several techniques. In one example, an augmentation is generated by performing a horizontal (i.e., left-right) flip on the corresponding document sample. In another example, an augmentation is generated by performing a cutout on the corresponding document sample (e.g., randomly selecting a patch of the document sample and masking it with black (e.g., value 0) pixels). In another example, an augmentation is generated by performing a random erase on the corresponding document sample (e.g., randomly selecting a patch of the document sample and replacing it with pixels that are white (e.g., value 255) or, alternatively, have a mean value of the patch or have random values). The particular technique(s) that are used to generate the augmentations may be a hyper-parameter (e.g., of the SLS module 100).

The feature representation network training module 210 is configured to train the feature representation network 220 to generate, for each input sample, a corresponding feature representation (e.g., a feature vector or other feature map). In one example, the dimensionality of the feature representations is 128. The feature representation network 220 may include, for example, a deep neural network, such as a convolutional neural network (CNN).

Figures 3A, 3B:
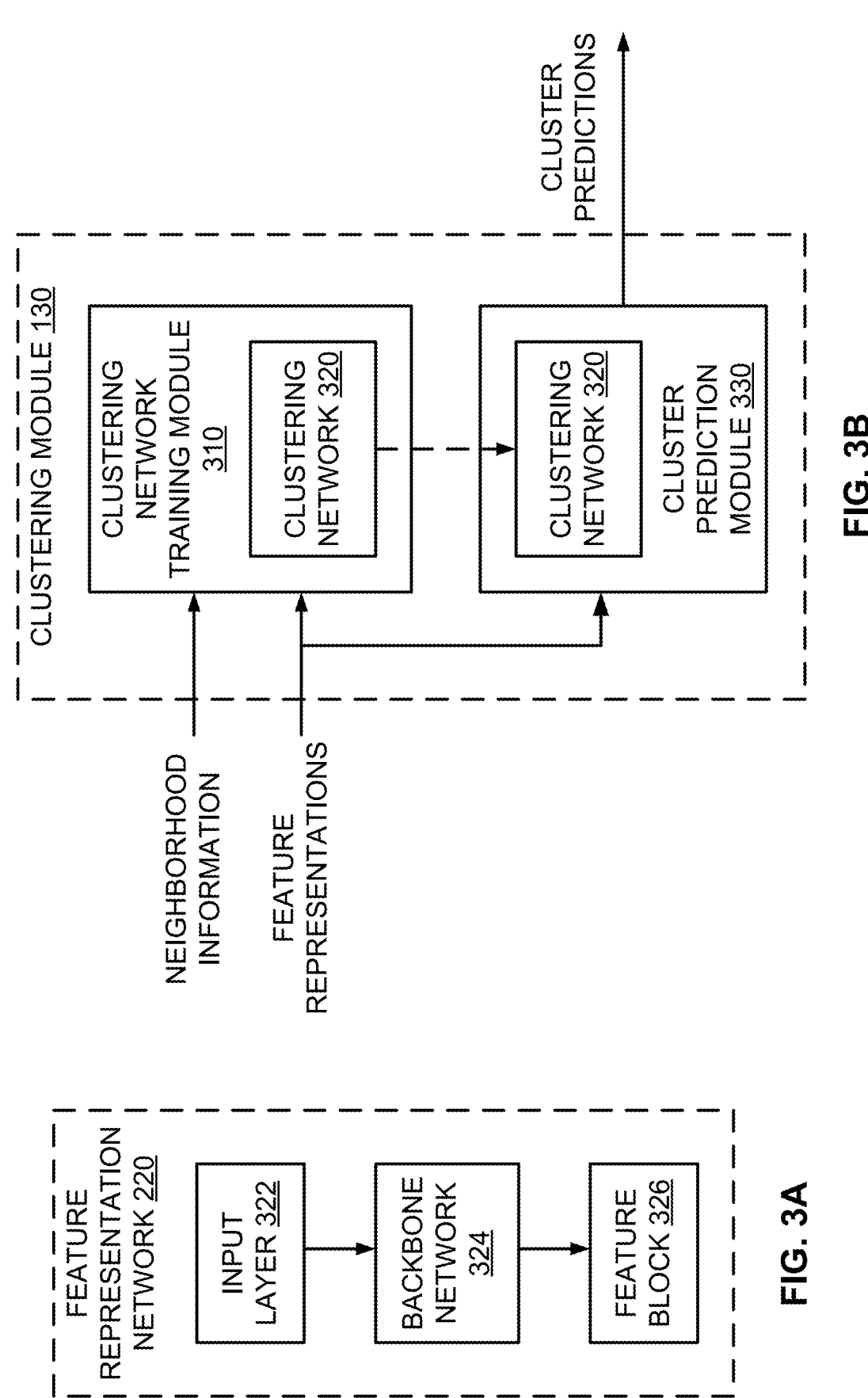
FIG. 3A shows an example of a feature representation network according to certain embodiments of the present disclosure.
FIG. 3B shows an example of a clustering module according to certain embodiments of the present disclosure.

FIG. 3A shows an example of an implementation of the feature representation network 220 that includes an input layer 322, a backbone network 324, and a feature block 326 that includes at least one layer. The input layer 322 may be configured to receive input samples and to convert each input sample to a corresponding input vector. The backbone network 324 is configured to receive each sample of training data to be processed (e.g., in the form of an input vector) and to generate a corresponding feature map (e.g., a feature vector). The backbone network 324 may be implemented, for example, as a deep neural network, such as a convolutional neural network (CNN). The backbone network 324 may be implemented, for example, as an implementation of a ResNet, a DenseNet, or a vision transformer. In one example, the backbone network 324 is implemented as a ResNet18 with the first layer removed (e.g., the backbone network 324 includes only the convolutional layers of the ResNet18). In one example, the backbone network 324 has ten layers, and the feature block 326 has two layers. The feature block 326 receives the feature maps generated by the backbone network 132 and may reduce a dimensionality of the feature maps to generate the feature representations (e.g., feature vectors of dimension 128). In one example, the backbone network 324 (e.g., a ResNet18) generates feature maps that are feature vectors of dimension 512, and feature block 326 processes these feature maps to generate corresponding feature vectors of dimension 128.

The feature representation network training module 210 may be implemented to train the feature model from scratch (e.g., the parameters of the feature representation network 220 may be initialized to random values). The feature representation network training module 210 may be configured to train the parameters of the feature representation network 220 using a contrastive learning loss function. Contrastive learning (also called "contrastive representation learning") may be generally described as a technique for learning an embedding space in which a distance between samples that are similar is less than a distance between samples that are dissimilar. For example, the feature representation network training module 210 may be configured to train the feature representation network 220 to maximize the distances (e.g., Euclidean or other distances) between feature representations generated from the training samples (e.g., to maximize distances between embeddings of dissimilar samples) while minimizing the distances (e.g., Euclidean or other distances) between a feature representation generated from a document sample and the feature representations generated from its corresponding augmentations (e.g., minimizing distances between embeddings of similar samples).

In one example, the contrastive learning loss function uses categorical cross-entropy to identify a positive sample among a set of negative samples. For example, the contrastive learning loss function may be implemented to optimize the negative log probability of correctly classifying the positive sample according to, e.g., Expression [1] below (also called InfoNCE loss):

$$\mathcal{L}_q = -\log \frac{\exp(q \cdot k_+ / \tau)}{\sum_{i=0}^{K} \exp(q \cdot k_i / \tau)} \qquad [1]$$

where q is a document sample, $k_+$ (the positive sample) is an augmentation of q, the other $k_i$ (negative samples) are other document samples or their augmentations, and $\tau$ is an optional temperature hyper-parameter that controls a concentration level of the embedding.

The feature representation generating module 230 is configured to use the trained feature representation network 220 (e.g., as trained by the feature representation network training module 210) to generate a feature representation for each of the set of samples. The neighborhood calculator 240 is configured to use information from the feature representations generated by the feature representation generating module 230 to calculate neighborhood information for the document samples. For example, the neighborhood calculator 240 may be configured to calculate the neighborhood information to include, for each document training sample, an indication of the d document training samples whose feature representations are closest to the sample's feature representation (in terms of, e.g., Euclidean distance) in the output space of the feature representation network 220 (e.g., the d neighbors of the sample), where the value of d is, for example, an integer in the range of from two to ten (e.g., the value of d is two, three, four, or five). In some embodiments, the d document training samples represents or is implemented as a hyper-parameter.

FIG. 3B shows an example of an implementation of the clustering module 120 that includes a clustering network training module 310 and a cluster prediction module 330. The clustering network training module 310 is configured to train a clustering network 320 based on the feature representations and the neighborhood information from the feature representation module 120. The clustering network training module 310 may be configured to train the clustering network 320 to group the feature representations into an integer number K of clusters that may be fixed or, alternatively, may be delineated by a range (e.g., $2 \leq K \leq 10$).

The clustering network training module 310 may be configured to train the clustering network 320 to generate each of the cluster predictions as an m-length predicted cluster probability vector, where m is the number of clusters and/or the i-th element of the vector represents the predicted probability that the corresponding document training sample is a member of the i-th cluster. The current cluster assignment of a training sample may be defined as the cluster that corresponds to the highest predicted probability among the elements of the sample's cluster prediction. The clustering network training module 310 may be configured to train the clustering network 320 using neighborhood consistency learning. For example, the clustering network training module 310 may be configured to train the clustering network 320 using a cross-entropy loss function in combination with the assumption that all neighbors are in the same cluster.

The clustering network training module 310 may also be configured to penalize predicted cluster probability vectors with a global entropy penalty function. Such penalization may tend to distribute the sample uniformly across clusters. By doing so, we can avoid over-confident assignments during model training. Such a penalty may help to stabilize self-labeling training, avoid model training divergence, and/or avoid training loss oscillation. In one example, the clustering network training module 310 is configured to apply a penalty function according to Expression [2] below:

$$-\sum_{i=1}^{K}(\text{cluster}\cdot prob[i] \times \log(\text{cluster}\cdot prob[i]))$$

where K denotes the number of clusters and cluster.prob[i] denotes the probability for a sample to be assigned to cluster i on average (e.g., the average probability of a sample to be assigned to a particular cluster without any prior knowledge). For example, for a uniform distribution, the average probability for a document to be assigned to cluster i is 1/K. This probability is the global level of cluster assignment without any knowledge of the document's contents.

Figures 4A, 4B:
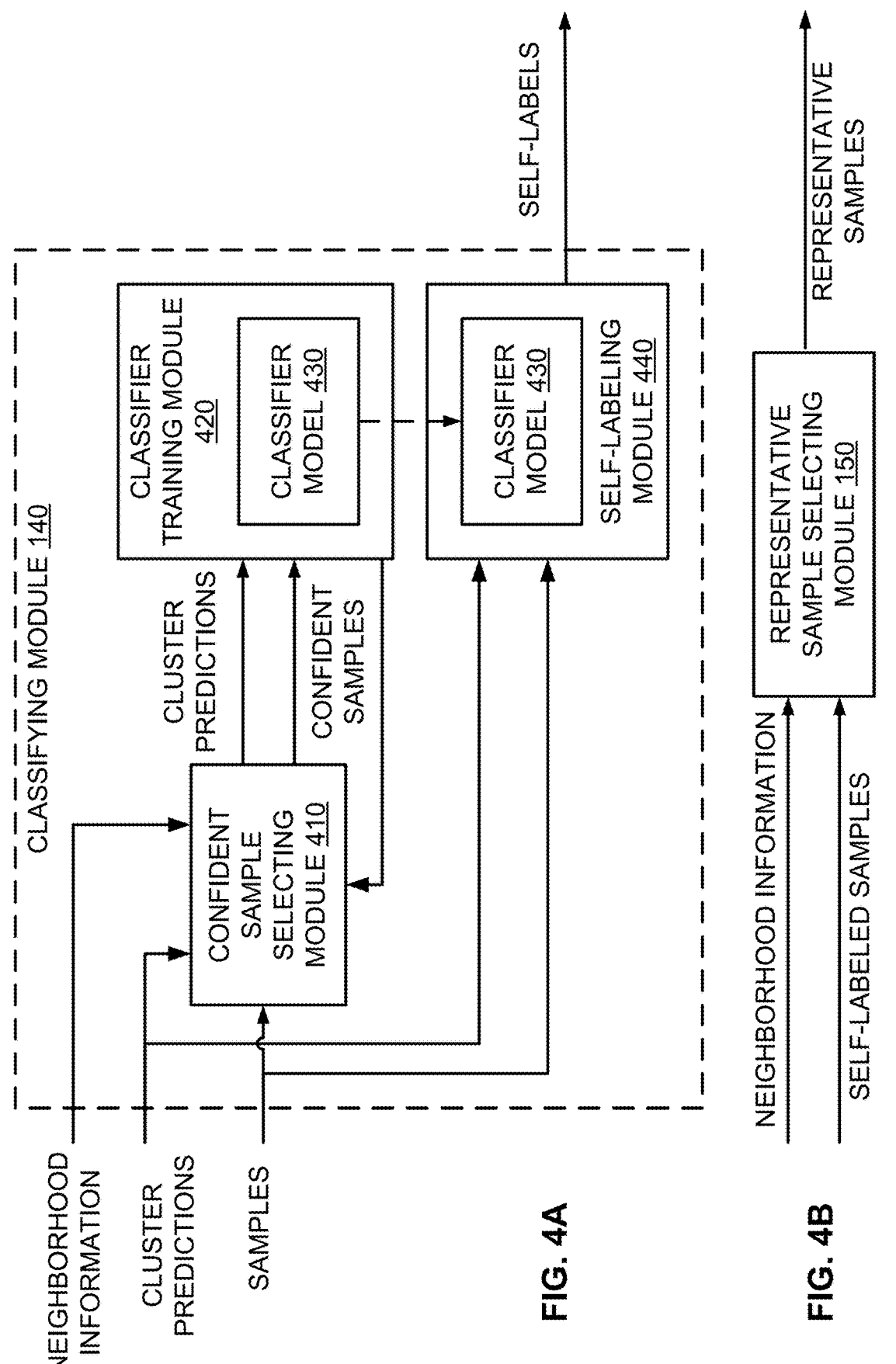
FIG. 4A shows an example of a classifying module according to certain embodiments of the present disclosure.
FIG. 4B shows an example of a representative sample selecting module according to certain embodiments of the present disclosure.

FIG. 4A shows an example of an implementation of the classifying module 140 that includes a confident sample selecting module 410, a classifier training module 420, and a self-labeling module 440. The confident sample selecting module 410 is configured to select confident samples from among the set of samples, based on cluster predictions from the clustering module 130 and neighborhood information from the feature representation module 120. The classifier training module 420 is configured to train a classifier model 430 to generate corresponding self-labels for the confident samples. The self-labeling module 440 is configured to use the trained classifier model 430 (e.g., as trained by the classifier training module 420) to generate corresponding self-labels for samples of the set of samples.

Excluding non-confident samples from the set of samples used to train the classifier model 430 may help to avoid model training divergence. The confident sample selecting module 410 may be configured to determine a sample to be confident if the predicted probability for the sample's cluster assignment is at least (alternatively, is not less than) a probability threshold (e.g., an instance-level criterion) and/or if the proportion of the sample's neighbors that share its cluster assignment is at least (alternatively, is not less than) a consistency threshold (e.g., a community-level criterion). For example, the confident sample selecting module 410 may be configured to identify a sample as confident if the predicted probability for its cluster assignment is at least 0.8 (alternatively, at least 0.9) and the proportion of its neighbors that share its cluster assignment is at least sixty percent (e.g., the sample's cluster assignment differs from the cluster assignments of less than forty percent of its neighbors). The value of the probability threshold and/or the value of the consistency threshold may be implemented as tunable hyper-parameters.

The classifier training module 420 may be configured to train the classifier model 430 to label each of the confident samples with the name of its assigned cluster as a soft self-label. The classifier training module 420 may be configured to train the classifier model 430 until convergence is reached (e.g., until the sample self-labels do not change any more) or until a maximum number of iterations is reached.

The performance of the classifier model 430 may be improved by using the updated model to update the confident samples. The classifying module 140 may be implemented to include a loop, for example, as shown in FIG. 4A. For each iteration of the loop, the classifier training module 420 may use the confident samples from the previous iteration to train the classifier model 430. As the classifier model 430 is trained, the quality of its clustering assignments may be expected to improve on average for all samples. Therefore, the updated model may be applied to the confident samples to obtain an improved set of samples that are more confident, and such a process may be continued by iterating the loop to obtain an improved set of confident samples for training the self-labeling model.

The self-labeling module 440 is configured to use the trained classifier model 430 (e.g., as trained by the classifier training module 420) to generate corresponding self-labels for samples of the set of samples. For example, the classifier training module 420 may be configured to use the trained classifier model 430 to label each sample with the name of its assigned cluster as a soft self-label.

FIG. 4B shows an example of an implementation of the representative sample selecting module 150 that is configured to receive the self-labeled samples and the neighborhood information and to produce a set of representative samples. It may be desired for the set of representative samples to approximate a distribution of the data within the input set of samples. For example, the set of representative samples may include a plurality of samples from each one of the clusters. Configurable parameters of the representative sample selecting module 150 may include the total number of samples in the set of representative samples (for example, as a numerical value (e.g., in a range of from one hundred or two hundred to five hundred or one thousand) or as a proportion of the size of the input set of samples (e.g., in a range of from five percent or ten percent to twenty percent or twenty-five percent)) or the number of samples selected per cluster (for example, as a numerical value (e.g., in a range of from ten or twenty to fifty or one hundred) or as a proportion of the size of the set of representative samples (e.g., according to the relative sizes of the clusters)).

The representative sample selecting module 150 may be configured to select, for each of the plurality of clusters, both confident samples and non-confident samples. Including non-confident samples in the set of representative samples may help to ensure that the set of representative samples more accurately represents the distribution of data within the set of samples. As discussed above with reference to the confident sample selecting module 410, the representative sample selecting module 150 may be configured to determine a sample to be confident based on one or both of an instance-level criterion (e.g., a probability of the sample's self-label) and a consistency-level criterion (e.g., an agreement between the sample's self-label and those of its neighbors). In such cases, the classifier model 430 may be configured to also generate a probability for each self-label, and the representative sample selecting module 150 may be configured to use the self-label probabilities to determine whether the sample satisfies an instance-level criterion. The proportion of confident samples to non-confident samples within the samples selected for each cluster may be indicated by a configurable parameter of the representative sample selecting module 150 (for example, in a range of from 50%/50% or 60%/40% confident/non-confident to 75%/25% or 80%/20% confident/non-confident).

Figures 5A, 5B:
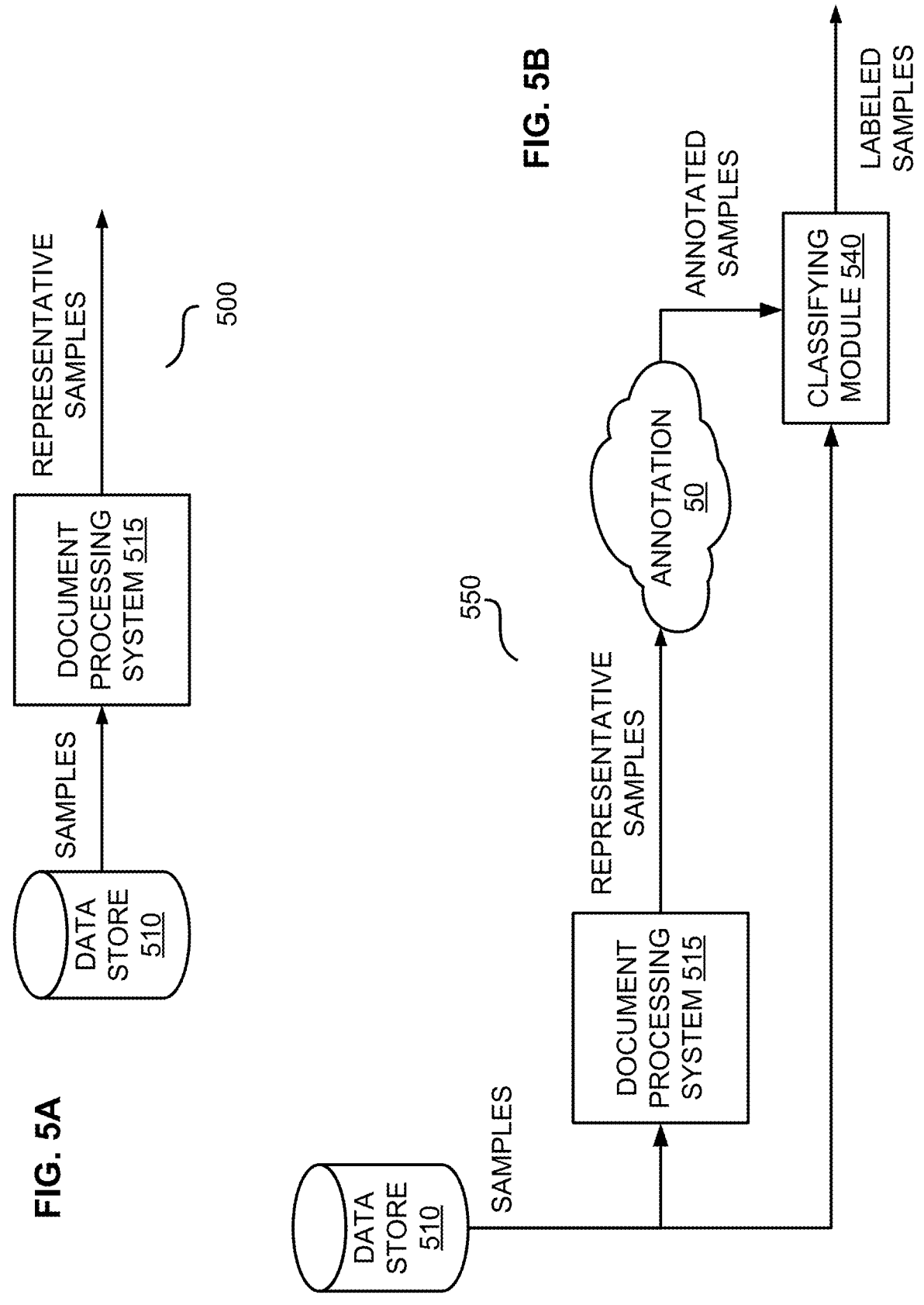
FIG. 5A shows a block diagram of a computing environment that includes a document processing system, according to certain embodiments of the present disclosure.
FIG. 5B shows a block diagram of an example of the computing environment depicted in FIG. 5A, according to certain embodiments of the present disclosure.

Instances of the SLS module 100 may be used as components of a multi-level distributed architecture for representative sample selection. FIG. 5A shows a block diagram of a computing environment 500 that includes a document processing system 515 that implements such an architecture. The computing environment 500 also includes a data store 510 that stores a large-scale set of samples (e.g., a large-scale set of unlabeled documents) and provides it to the document processing system 515.

Figure 6:
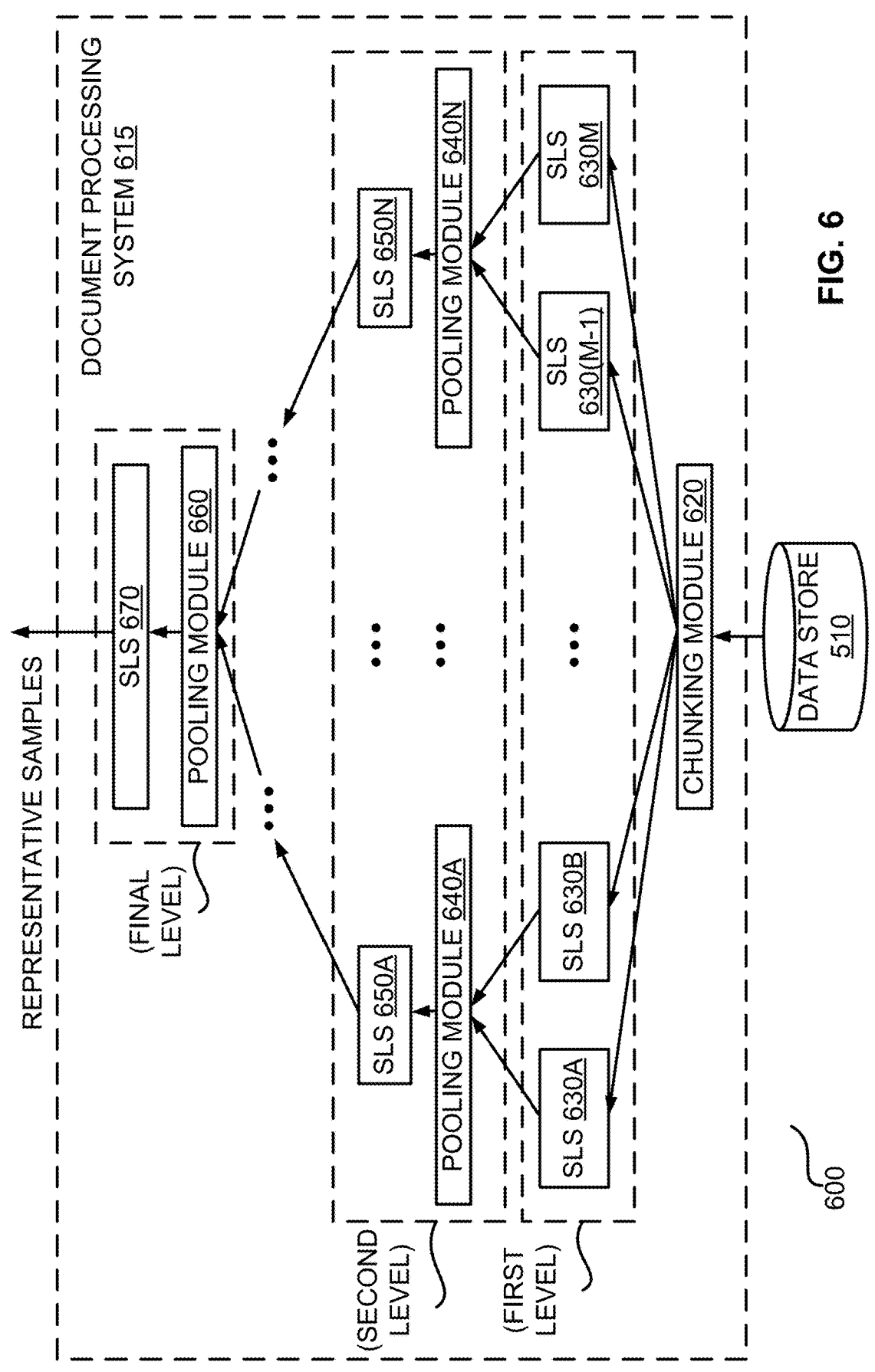
FIG. 6 shows a block diagram of another example of the computing environment depicted in FIG. 5A, according to certain embodiments of the present disclosure.

FIG. 6 shows a block diagram of an example 600 of the computing environment 500 that includes the data store 510 and an example 615 of the document processing system 515. This multi-level system includes instances of the SLS module 100 that produce sets of representative samples at each level which are merged and used to train the models at the next level from bottom to top. At each such instance of the SLS module 100, the training is based on a subset of the large-scale set of data (e.g., a chunk or pool) so that the models within the instance only represent the distribution of this subset. The process continues until it reaches the top level, where the selected samples may be expected to represent the distribution of the large-scale set of data.

The document processing system 615 is configured to process a large-scale set of data samples (e.g., from the data store 510) to produce a reduced set that includes representative samples (e.g., a set of samples that approximates a distribution of the data within the large-scale set). In various embodiments, the document processing system 615 includes a chunking module 620 configured to divide the large set into chunks of samples, instances of the SLS module 100 configured to group the samples of each chunk into clusters and to produce a set of representative samples for each chunk, and two or more levels that each include instances of a pooling module 640 configured to consolidate two or more of the sets of representative samples as a pool and instances of the SLS module 100 configured to select a set of representative samples for each pool. The set of representative samples produced by an instance of SLS module 100 of the final level is outputted as a representative set of samples for the large-scale set.

The document processing system 615 may be implemented using mapreduce management. For example, the document processing system 615 using a MapReduce model in which each instance of the SLS module 100 is an instance of the map function and each instance of the pooling module 640 is an instance of the reduce function.

The chunking module 620 is configured to partition a large set of document samples from data store 510 (e.g., in a document format (e.g., PDF) and/or in an image format (e.g., TIFF)) into M non-overlapping chunks and to distribute the chunks among M corresponding instances 630A-630M of the SLS module 100. The parameter M is a positive integer greater than one that may be arbitrarily large (e.g., depending on the amount of computing and/or storage resources available for implementing the architecture). Chunking module 620 may be implemented to produce chunks of size, for example, one hundred, two hundred, five hundred, or one thousand or more, and the chunk size may be selected according to resource constraints and/or an estimate of the number of different classes within the large set of samples. For ease of implementation and/or to maintain a consistency among the processing of the various chunks, it may be desired for each of the M chunks to be of equal size (e.g., to have the same number of samples), although chunks of different sizes are also possible.

The chunking module 620 is configured to distribute the chunks among M corresponding instances 630A-630M of the SLS module 100. Each instance 630A-630M of the SLS module 100 may be implemented as described above (e.g., with reference to FIGS. 1-4) to group the samples of the corresponding chunk into a plurality of clusters (e.g., to assign a soft self-label to each sample of the corresponding chunk) and to select a set of representative samples for the chunk. The M instances 630A-630M of SLS module 100 may be implemented as a set of one or more processors that operate together as a unit to execute each instance (e.g., in a round-robin manner), as M such sets of one or more processors that each execute a corresponding one of the M instances (e.g., in parallel), or more generally as any number of such sets of one or more processors that execute the M instances 630A-630M of SLS module 100 in any combination of serial and/or parallel operation.

Figure 7:
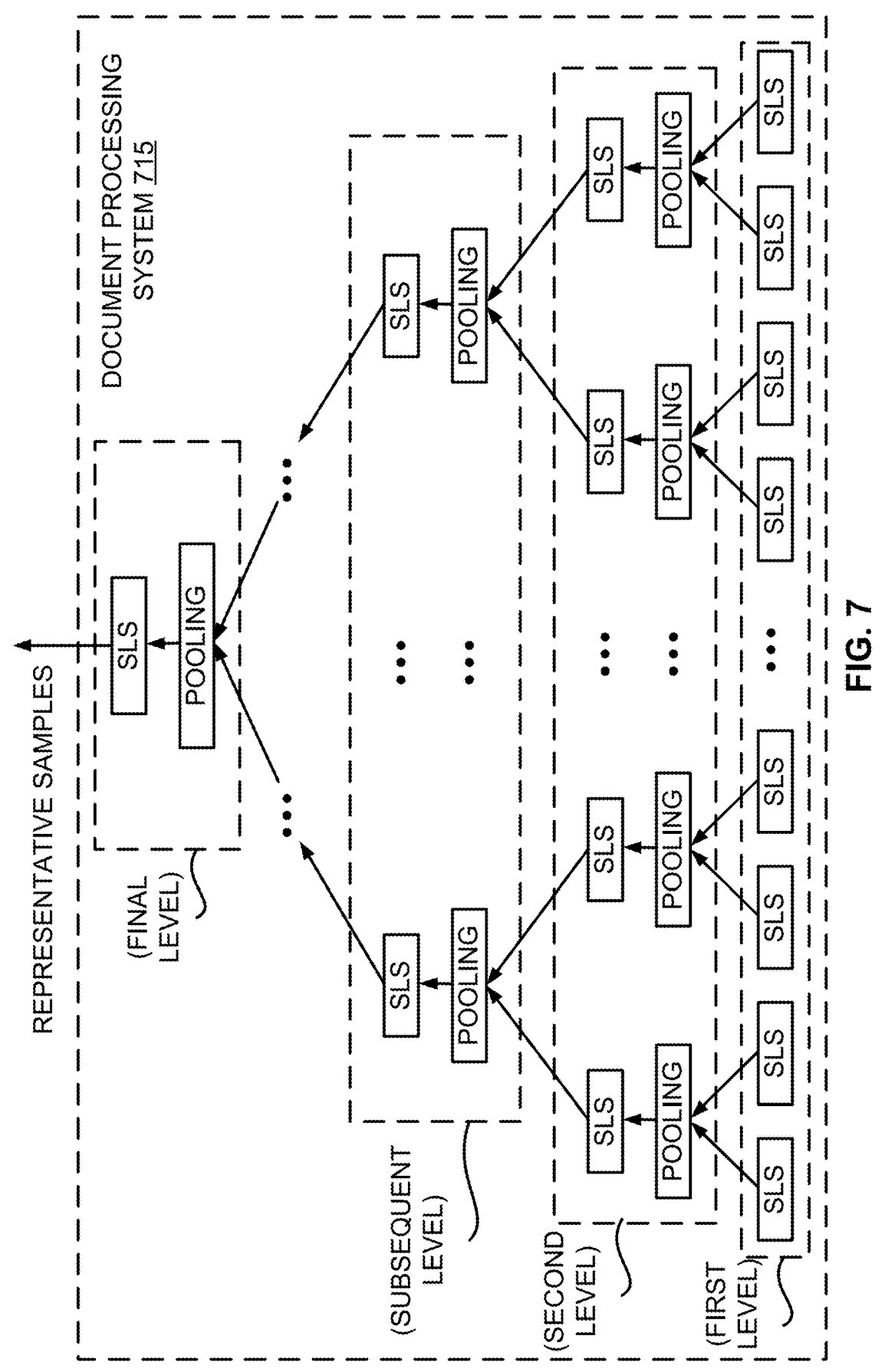
FIG. 7 shows a block diagram of a document processing system according to certain embodiments of the present disclosure.

The document processing system 615 also includes two or more subsequent levels that each include one or more instances of a pooling module 640 and one or more corresponding instances of the SLS module 100. At each level, each instance of the pooling module 640 is configured to consolidate two or more of the sets of representative samples from the previous level as a pool, and the corresponding instance of the SLS module 100 is configured to receive the pool as an input set of samples and to select a set of representative samples for the pool. In such manner, for example, all of the sets of representative samples from the previous level may be processed to produce a smaller number of sets of representative samples, and the sequence of sampling and pooling may be repeated for multiple levels until a desired reduction in the number of representative samples is achieved. The example of FIG. 6 shows the second level of the document processing system 615 that includes N instances 640A-640N of the pooling module 640 and N corresponding instances 650A-650N of the SLS module 100, and the final level of the document processing system 615 that includes an instance 660 of the pooling module and a corresponding instance 670 of the SLS module 100 that produces a set of representative samples for the large-scale set. FIG. 7 is a block diagram of an example 715 of the document processing system 615 that shows a subsequent level that is intermediate to the second level and the final level.

FIG. 5B shows a block diagram of an example 550 of the computing environment 500 that includes an annotation process 50 and a classifying module 540. In this example, the samples of the set of representative samples for the large-scale set are annotated by the annotation process 50, the resulting annotated samples are used by the classifying module 540 to train a global classifier model, and the classifying module 540 uses the trained global classifier model to label samples of the large-scale set of samples. The classifying module 540 may be implemented within the document processing system 515 or separately (for example, in a separate system or device).

The annotation process 50 includes reviewing the samples of the set of representative samples for the large-scale set and annotating each sample with a corresponding label. The annotation process 50 may be performed by one or more human reviewers, and the labels may be taken from a predetermined list of labels (e.g., "e-mail," "photograph," "purchase agreement," "security instrument," "amortization schedule," etc.).

Figure 8:
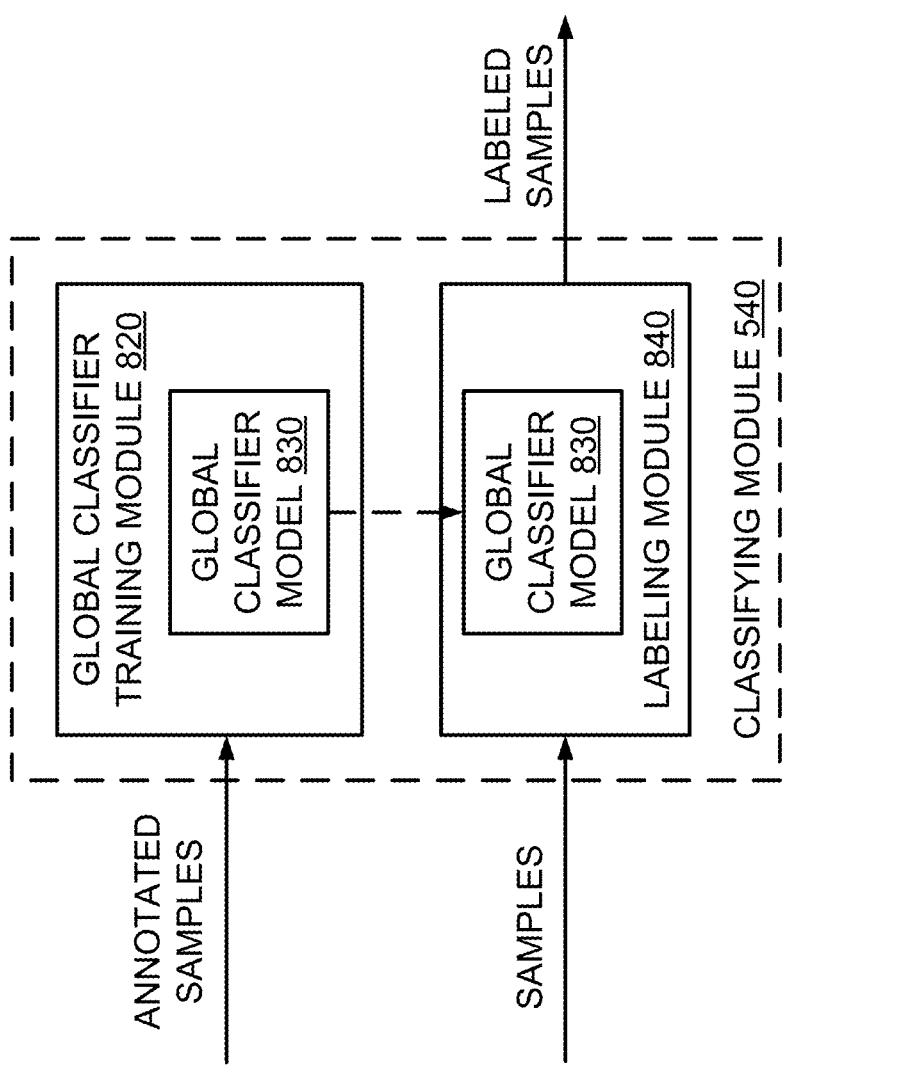
FIG. 8 shows an example of a classifying module according to certain embodiments of the present disclosure.

FIG. 8 shows an example of an implementation of the classifying module 540 that includes a global classifier training module 820 and a labeling module 840. The global classifier training module 820 is configured to train a global classifier model 830 to label samples of the annotated samples, using the annotated labels as ground truth. If the global classifier training module 820 determines that the accuracy of the trained global classifier model 830 satisfies a threshold, then the labeling module 840 uses the trained global classifier model 830 to label the samples of the large-scale set.

If the global classifier training module 820 determines that the accuracy of the trained global classifier model 830 fails to satisfy the threshold, it may iterate the training of the global classifier model 830 with one or more modifications until the desired accuracy is achieved. For example, the global classifier training module 820 may be configured to perform one or more of the following modifications at each iteration:

1) use a different classifier model for the global classifier model 830;

2) fine-tune the global classifier model 830 by, for example, using a different value for each of one or more hyper-parameters;

3) cause the document processing system 515 to re-run the bottom-to-top sample selection to provide additional representative samples for annotation and training of the global classifier model 830. For example, the global classifier training module 820 may cause the document processing system 515 to re-run the bottom-to-top sample selection so that the number of samples that are passed from each level up to the next is increased (e.g., so that each instance of SLS module

100 is configured to select a larger set of representative samples). The number of samples that are passed from each level up to the next may be increased, for example, by increasing the sampling ratio at each instance of SLS module 100.

Tuning of the hyper-parameters of the SLS module 100 and/or of the document processing system 515 may be performed using Bayesian optimization. Such optimization may be applied, for example, to find an optimal combination of the parameters of the full pipeline to achieve optimal clustering performance given a predefined range of cluster numbers (e.g., up to ten). Efficiency of the hyper-parameter tuning process may be improved by using selected sets of hyper-parameter values as initial points for warm start. For example, such initial selection may serve to narrow down the exploration region. In experiments, using selected sets of hyper-parameter values as initial points for warm start was found to provide a good hyper-parameter set in just a few runs.

Hyper-parameters may include parameters for models (e.g., input size, augmentation choices, dropout rate, loss penalty weight, optimizer choice), parameters of feature dimension (e.g., output feature dimension), and/or parameters of clustering and filtering (e.g., confidence level, neighborhood consistency level). Examples of initial values for such hyper-parameters may include the following:

size of input samples to the SLS module 100: (224, 224), (512, 512), etc.

augmentations of training samples: at least one of random flip-left-right, cutout, random erase, etc.

dropout rate (e.g., for training of the feature representation network 220 and/or the clustering network 320): 0.1, 0.2, 0.5, etc.

loss penalty weight (e.g., for training of the feature representation network 220 and/or the clustering network 320): 1e-4, 1e-3, 1e-2, 1e-1, etc.

optimizer choice (e.g., for training of the feature representation network 220 and/or the clustering network 320): Adam, stochastic gradient descent (SGD), etc.

output feature dimension of feature representation network 220 (too small a value may result in information loss, while too large a value may be expensive and/or may capture more noise instead of representative information): 128, 256, 512, etc.

confidence level (e.g., a threshold predicted cluster probability for a sample to be considered (e.g., by confident sample selecting module 410) as a confident sample at an instance level): e.g., 0.8, 0.9, etc.

consistency level: (e.g., a threshold neighborhood clustering consistency for a sample to be considered (e.g., by confident sample selecting module 410) as a confident (or consistent) sample at a community level): e.g., at least 60% of neighbors are in the same cluster.

In some embodiments, hyper-parameters may be identified or determined based on a trial and error method.

FIG. 9 shows a flowchart of a process 900 for self-labeling a set of samples, according to certain embodiments of the present disclosure. One or more computing devices (e.g., one or more servers) implement operations depicted in FIG. 9 by executing suitable program code. For illustrative purposes, the process 900 is described with reference to certain examples depicted in the figures. Other implementations, however, are possible.

At block 904, the process 900 involves using a trained feature representation network to generate, for each of a plurality of samples, a corresponding one of a plurality of feature representations. As described above with reference to feature representation network training module 210, training the feature model may include applying a contrastive learning loss function. As described above with reference to feature representation network training module 210, training the feature model may be performed using document data samples and augmentations of the document data samples. In one example, the dimensionality of the feature representations is 128.

At block 908, the process 900 involves obtaining neighborhood information from the plurality of feature representations. For example, the neighborhood information may indicate, for each of the plurality of samples, the p samples of the plurality of samples whose feature representations are closest to the sample's feature representations (in terms of, e.g., Euclidean distance).

At block 912, the process 900 involves using a clustering network that is trained using the plurality of feature representations and the neighborhood information to generate, for the plurality of samples, a corresponding plurality of cluster predictions.

At block 916, the process 900 involves selecting a set of confident samples, using the plurality of cluster predictions and the neighborhood information.

At block 920, the process 900 involves using a classifier model that is trained using the set of confident samples to generate, for the plurality of samples, a corresponding plurality of self-labels, wherein each of the plurality of self-labels indicates a cluster assignment of a corresponding sample of the plurality of samples.

At block 924, the process 900 involves selecting a set of representative samples from among the set of samples, based on the plurality of self-labels.

Figure 10:
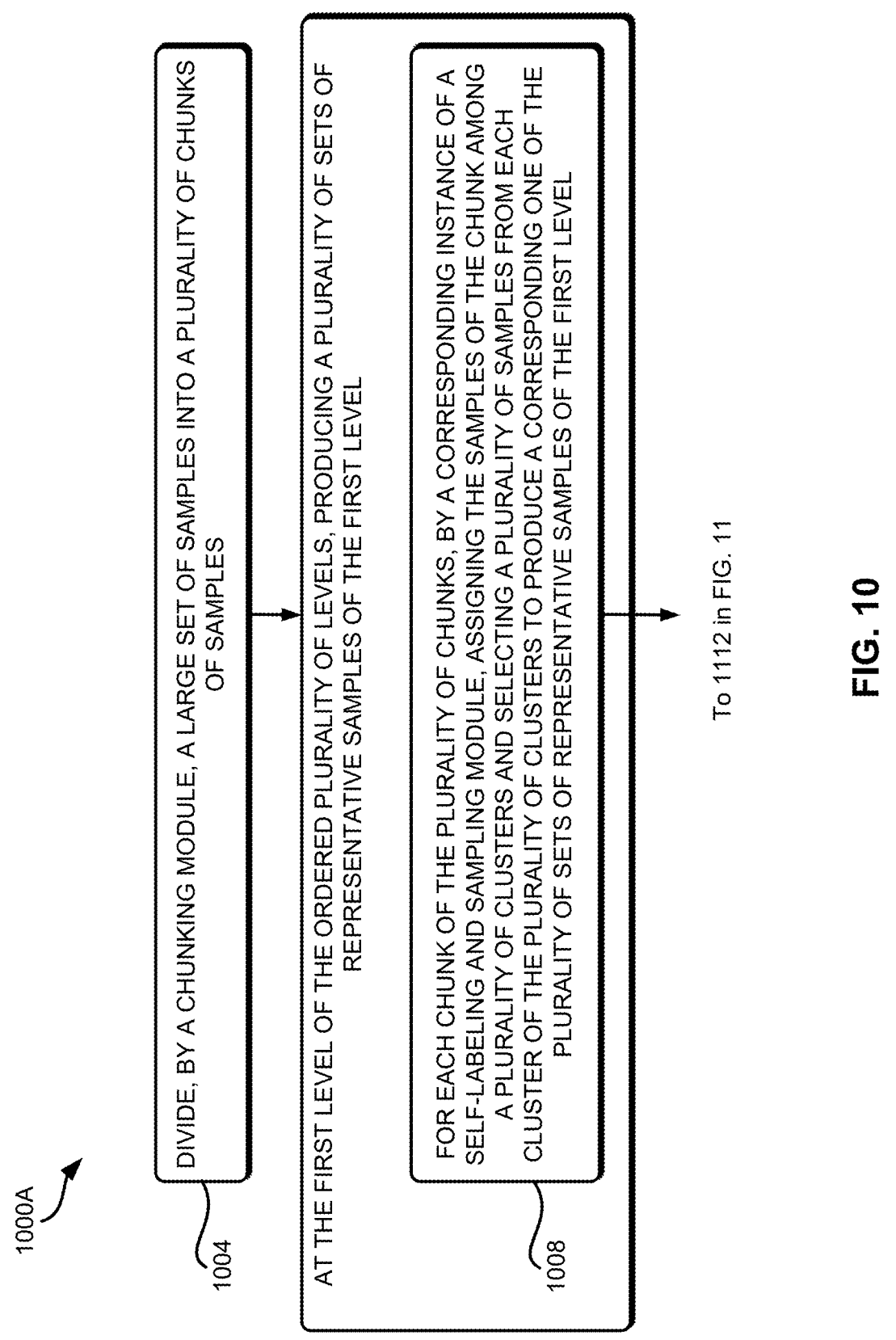

FIGS. 10 and 11 show a flowchart of a process 1000 (in parts 1000A and 1000B) for labeling samples of a large set of samples that is performed in an ordered plurality of levels, including a first level and at least one subsequent level including a final level, according to certain embodiments of the present disclosure. One or more computing devices (e.g., one or more servers) implement operations depicted in FIGS. 10 and 11 by executing suitable program code. For illustrative purposes, the process 1000 is described with reference to certain examples depicted in the figures. Other implementations, however, are possible.

At block 1004, the process 1000 involves dividing (e.g., by a chunking module 520) a large set of samples into a plurality of chunks of samples.

At the first level of an ordered plurality of levels, the process 1000 involves producing a plurality of sets of representative samples of the first level. At block 1008, the process 1000 involves, for each chunk of the plurality of chunks (e.g., by a corresponding instance of a self-labeling and sampling module 100), assigning the samples of the chunk among a plurality of clusters and selecting a plurality of samples from each cluster of the plurality of clusters to produce a corresponding one of the plurality of sets of representative samples of the first level.

At each subsequent level of the ordered plurality of levels, the process 1000 involves producing at least one set of representative samples of the level. At block 1112, the process 1000 involves pooling the plurality of sets of representative samples of the previous level among the ordered plurality of levels to obtain at least one pool, comprising at least one instance of pooling (e.g., by at least one pooling module) at least two of the plurality of sets of representative samples of the previous level to obtain a corresponding pool of the at least one pool. At block 1112, the process 1000 involves, for each pool of the at least one pool (e.g., by a corresponding instance of the self-labeling and sampling module 100), assigning the samples of the pool among a plurality of clusters and selecting a plurality of samples from each cluster of the plurality of clusters to produce a corresponding one of at least one set of representative samples of the level.

At block 1120, the process 1000 involves training (e.g., by a global classifier training module 820) a global classifier model (e.g., model 830) based on samples from the at least one set of representative samples of the final level of the ordered plurality of levels to obtain a trained global classifier model. At block 1124, the process 1000 involves labeling, using the trained global classifier model, samples of the large set of samples.

Figure 12:
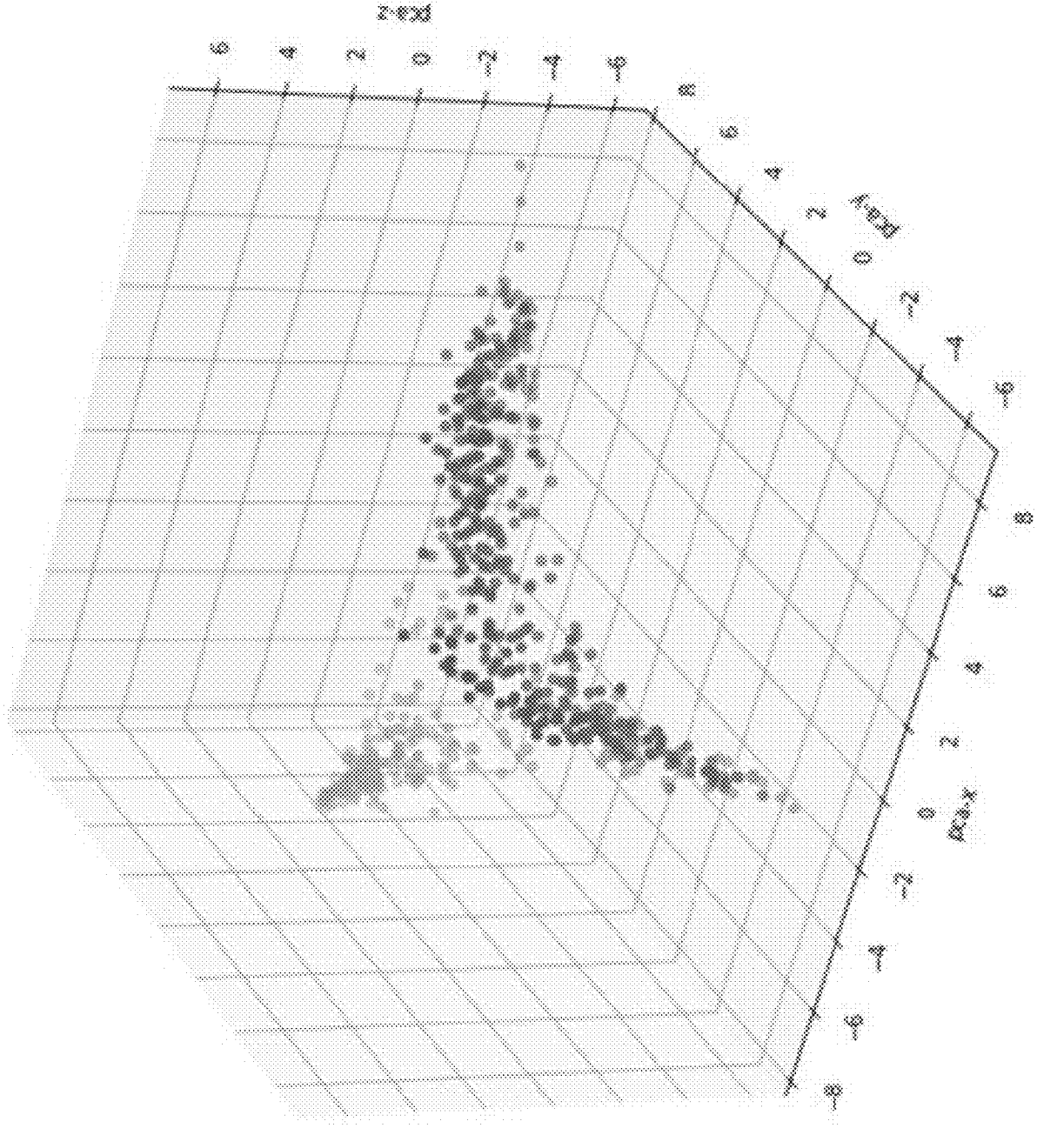
FIG. 12 shows an example of a 3D visualization of a clustering performed on a subset of an open dataset according to certain embodiments of the present disclosure.

Results of clustering may be evaluated using, for example, a visualization platform and/or clustering silhouette scoring. FIG. 12 shows an example of a 3D visualization of a clustering performed on a subset of an open dataset. In this example, the feature representation vectors are mapped to a three-dimensional space using principal component analysis (PCA). In FIG. 12, each dot represents a document, and each of the three different colors (teal, blue, brown) represents a corresponding one of three different clusters.

Figure 13:
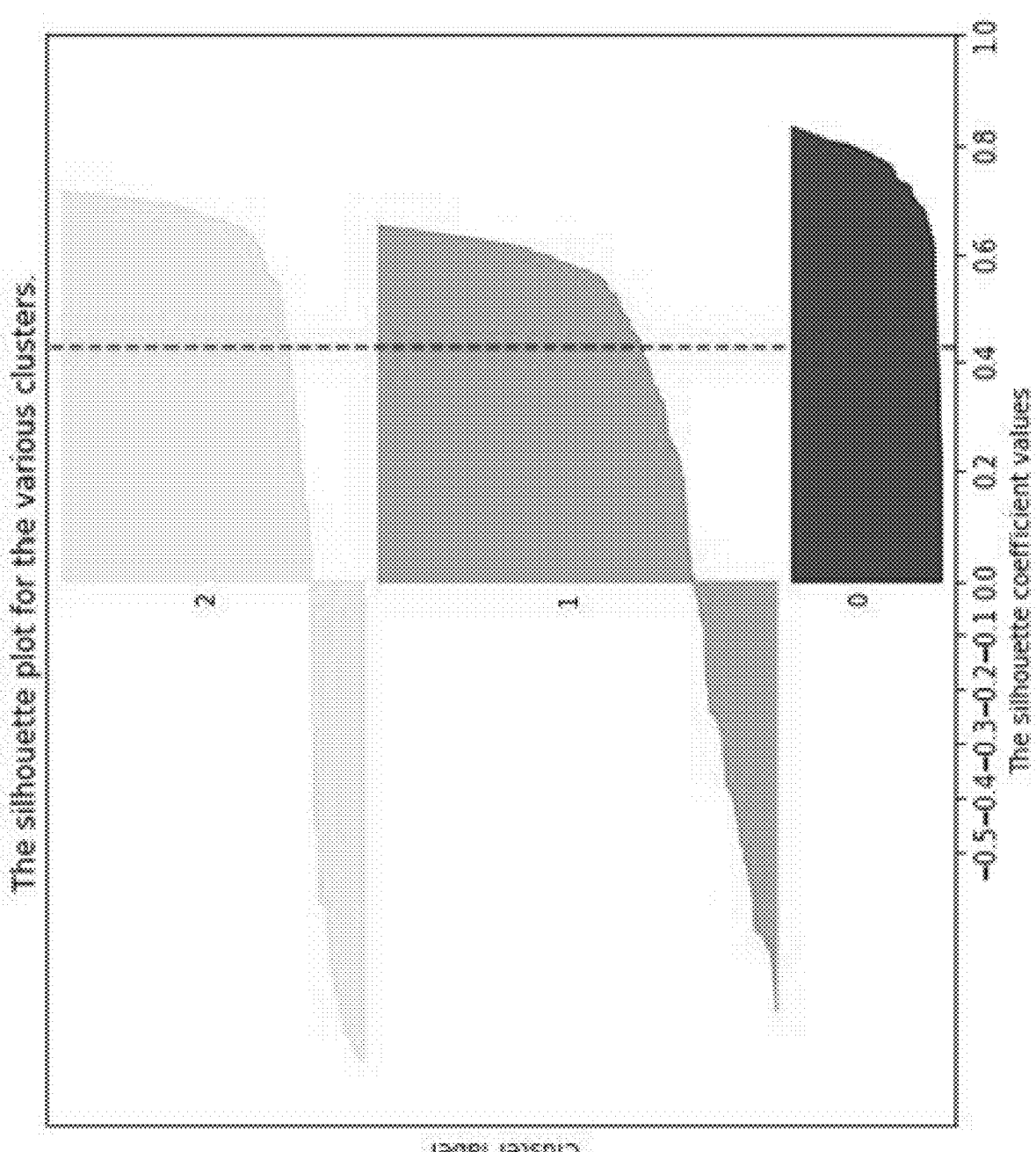
FIG. 13 shows an example of a clustering silhouette score on an open dataset according to certain embodiments of the present disclosure.

FIG. 13 shows an example of a clustering silhouette score on an open dataset. The silhouette coefficient is a measure of how similar a sample is to its own cluster compared to other clusters, and it may be calculated for a sample i as $s(i)=[b(i)-a(i)]/\max\{a(i), b(i)\}$, where $a(i)$ is the mean distance between the sample i and all samples in the same cluster, and $b(i)$ is the smallest mean distance of the sample i to all samples in any other cluster. The best value is 1 (e.g., for $a(i)=0$) and worst value is $-1$ (e.g., for $b(i)=0$). Clustering models with high silhouette coefficients are more dense, where samples in the same cluster are similar to each other and are well separated from other clusters.

Figure 14:
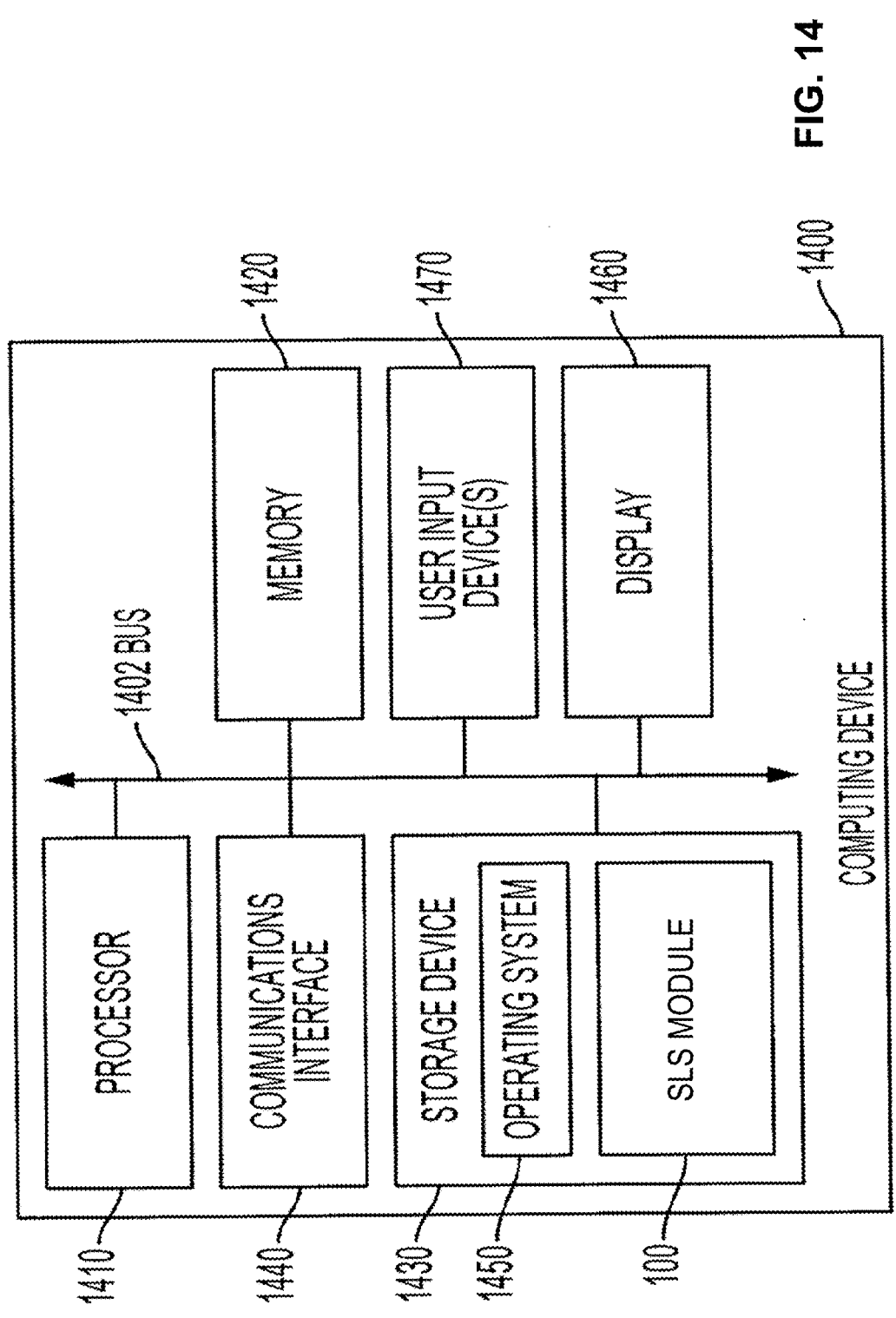
FIG. 14 shows a block diagram of an example computing device suitable for implementing aspects of the techniques and technologies presented herein.

FIG. 14 shows an example computing device 1400 suitable for implementing aspects of the techniques and technologies presented herein. The example computing device 1400 includes a processor 1410 (e.g., at least one processor) which is in communication with a memory 1420 and other components of the computing device 1400 using one or more communications buses 1402. The processor 1410 is configured to execute processor-executable instructions stored in the memory 1420 to perform document processing according to different examples, such as part or all of the example process 900 or 1000 or other processes described above with respect to FIGS. 9-11. In an example, the memory 1420 is a non-transitory computer-readable medium that is capable of storing the processor-executable instructions. The computing device 1400, in this example, also includes one or more user input devices 1470, such as a keyboard, mouse, touchscreen, microphone, etc., to accept user input. The computing device 1400 also includes a display 1460 to provide visual output to a user.

The computing device 1400 can also include or be connected to one or more storage devices 1430 that provides non-volatile storage for the computing device 1400. The storage devices 1430 can store an operating system 1450 utilized to control the operation of the computing device 1400. The storage devices 1430 can also store other system or application programs and data utilized by the computing device 1400, such as modules implementing the functionalities provided by the SLS module 100, the computing environment 500, the document processing system 515, or any other functionalities described above with respect to FIGS. 1-8. The storage devices 1430 might also store other programs and data not specifically identified herein.

The computing device 1400 can include a communications interface 1440. In some examples, the communications interface 1440 may enable communications using one or more networks, including: a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate arrays (FPGAs) specifically, to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C. For the purposes of the present document, the phrase "A is based on B" means "A is based on at least B."

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

What is claimed is:

1. A computer-implemented method, comprising using at least one processor to perform the following operations:

receiving, by a feature representation network, a plurality of samples, wherein each sample is associated with an unlabeled document devoid of a ground truth label;

generating, using the feature representation network and for each of the plurality of samples, a corresponding one of a plurality of feature representations;

obtaining neighborhood information from the plurality of feature representations, wherein neighborhood information is computed in a learned embedding space produced by the feature representation network and indicates, for each sample, a set of nearest neighbors between samples based on a distance in the learned embedding space;

using a clustering network that is trained using the plurality of feature representations and the neighborhood information to generate, for the plurality of samples, a corresponding plurality of cluster predictions;

selecting a set of confident samples using the plurality of cluster predictions and the neighborhood information, wherein a sample of the plurality of samples is included in the set of confident samples when:

a predicted probability for a cluster assignment taken as a maximum element of a predictive cluster probability vector of the corresponding plurality of cluster predictions associated with the sample satisfies a probability threshold; and a proportion of neighbors of the set of nearest neighbors sharing a same cluster assignment associated with the sample satisfies a consistency threshold;

using a classifier model that is trained using the set of confident samples to generate, for the plurality of samples, a corresponding plurality of self-labels, wherein each of the plurality of self-labels indicates a cluster assignment of a corresponding sample of the plurality of samples; and selecting a set of representative samples from among the plurality of samples, of self label, wherein the set of representative samples comprises a total number of samples including a number of confident samples selected from the set of confident samples and a number of non-confident samples, and wherein the total number of samples is determined using a configurable parameter that:

scales the total number of samples as a proportion of a size of the plurality of samples; and defines a ratio of the number of confident samples to the number of non-confident samples to be within a predefined range.

2. The computer-implemented method according to claim 1, wherein the feature representation network is trained using a contrastive learning loss function.

3. The computer-implemented method according to claim 1, wherein obtaining neighborhood information comprises:

calculating, for a sample of the plurality of samples, a number d of samples of the plurality of samples whose feature representations are closest to the feature representation of the sample, where d is a hyper-parameter identified based on a trial and error method, and wherein the distance comprises a Euclidean distance.

4. The computer-implemented method according to claim 1, wherein the feature representation network includes a backbone network and a feature block, and wherein generating the plurality of feature representations comprises:

converting each unlabeled document into a respective input vector;

transforming, using the backbone network, each respective input vector into a respective feature vector; and dimensionally reducing, using the feature block, each respective feature vector into a respective feature representation of the plurality of feature representations.

5. The computer-implemented method according to claim 1, wherein the predicted cluster probability vector comprises a length, m, where m is a number of clusters.

6. The computer-implemented method according to claim 1, wherein the probability threshold for the cluster assignment of the corresponding plurality of cluster predictions for each sample is defined on a sample level basis and is implemented as a tunable hyper-parameter.

7. The computer-implemented method according to claim 1, wherein the consistency threshold for the proportion of neighbors sharing the same cluster assignment associated with each sample is defined on a community level basis and implemented as a tunable hyper-parameter.

8. The computer-implemented method according to claim 1, wherein the set of representative samples approximates a distribution of data within the plurality of samples.

9. The computer-implemented method according to claim 1, wherein the set of representative samples includes samples from each of a plurality of clusters indicated by the plurality of self-labels.

10. The computer-implemented method according to claim 1, wherein the configurable parameter further defines a proportion of the number of confident samples to the number of non-confident samples to be within a predefined range on a per-cluster basis.

11. A computer-implemented method, comprising using at least one processor to perform the following operations in an ordered plurality of levels, including a first level and at least one subsequent level including a final level:

receiving, by a chunking module, a set of samples, wherein each sample is associated with an unlabeled document devoid of a ground truth label;

dividing, by the chunking module, the set of samples into a plurality of non-overlapping chunks of samples;

at the first level of the ordered plurality of levels, producing a plurality of sets of representative samples of the first level, comprising:

for each chunk of the plurality of non-overlapping chunks:

obtaining neighborhood information from a plurality of feature representations of each sample of each chunk, wherein neighborhood information is computed in a learned embedding space and indicates, for each sample, a set of nearest neighbors between samples based on a distance in the learned embedding space;

generating, for the samples of the chunk, a corresponding plurality of cluster predictions; and selecting a plurality of confident samples from each cluster of the plurality of clusters to produce a corresponding one of the plurality of sets of representative samples of the first level, wherein a sample of the set of samples is included in the plurality of confident samples when:

a predicted probability for a cluster assignment taken as a maximum element of a predictive cluster probability vector of the corresponding plurality of cluster predictions associated with the sample satisfies a probability threshold; and a proportion of neighbors of the set of nearest neighbors sharing a same cluster assignment associated with the sample satisfies a consistency threshold;

at each subsequent level of the ordered plurality of levels, producing at least one set of representative samples of the level, comprising:

pooling the plurality of sets of representative samples of the previous level among the ordered plurality of levels to obtain at least one pool, comprising at least one instance of:

pooling, by at least one pooling module, at least two of the plurality of sets of representative samples of a previous level to obtain a corresponding pool of the at least one pool; and for each pool of the at least one pool assigning the samples of the pool among a plurality of clusters based on neighborhood information associated with the samples of the pool; and selecting a plurality of samples from each cluster of the plurality of clusters to produce a corresponding one of at least one set of representative samples of the level, wherein the corresponding one of the at least one set of representative samples comprises a total number of samples including a number of confident samples selected from the plurality of confident samples and a number of non-confident samples, and wherein the total number of samples is determined using a configurable parameter that:

scales the total number of samples as a proportion of a size of the set of samples; and defines a ratio of the number of confident samples to the number of non-confident samples to be within a predefined range;

training, by a global classifier training module, a global classifier model based on samples from the at least one set of representative samples of the final level of the ordered plurality of levels to obtain a trained global classifier; and labeling, using the trained global classifier model, samples of the set of samples.

12. The computer-implemented method according to claim 11, wherein training the global classifier model includes using annotations of the samples from the at least one set of representative samples of the final level as ground truth labels.

13. The computer-implemented method according to claim 12, wherein the annotations of the samples are provided by at least one human.

14. The computer-implemented method according to claim 12, comprising determining that an accuracy of the trained global classifier model on the at least one set of representative samples of the final level satisfies a threshold.

15. The computer-implemented method according to claim 11, wherein the configurable parameter further defines a proportion of the number of confident samples to the number of non-confident samples to be within a predefined range on a per-cluster basis.

16. A computer-implemented method to obtain a set of documents that is representative of a set of documents, the method comprising:

receiving a set of unlabeled documents, wherein each unlabeled document is devoid of a ground truth label;

at a first level of an ordered plurality of levels, dividing a set of unlabeled documents into a plurality of non-overlapping chunks;

for each chunk of the plurality of non-overlapping chunks:

training a corresponding instance of a clustering model on a training set of documents of the chunk;

obtaining neighborhood information from a plurality of feature representations of each unlabeled document of the chunk, wherein neighborhood information is computed in a learned embedding space and indicates, for each sample, a set of nearest neighbors between unlabeled documents based on a distance in the learned embedding space;

generating, for the unlabeled documents of the chunk, and using the trained corresponding instance, a corresponding plurality of cluster predictions; and selecting a set of documents of the chunk that includes, for each of the plurality of clusters, a plurality of confident documents and a plurality of non-confident documents, wherein a document of the set of unlabeled documents is included in the plurality of confident documents when:

a predicted probability for a cluster assignment taken as a maximum element of a predictive cluster probability vector of the corresponding plurality of cluster predictions associated with the sample satisfies a probability threshold; and a proportion of neighbors of the set of nearest neighbors sharing a same cluster assignment associated with the sample satisfies a consistency threshold;

at each of a second and subsequent levels of the ordered plurality of levels:

pooling sets of documents from a previous level to obtain at least one pool; and for each of the at least one pool:

training a corresponding instance of a clustering model on a training set of documents of the pool;

clustering the documents of the pool, using the trained corresponding instance, into a plurality of clusters based on neighborhood information associated with the documents of the pool, the neighborhood information indicating a distance between the documents of the pool in an embedding space; and selecting a set of documents of the pool that includes, for each of the plurality of clusters, a plurality of confident documents and a plurality of non-confident documents, wherein the set of documents comprises a total number of documents including a number of confident documents selected from the plurality of confident documents and a number of non-confident documents, and wherein the total number of documents is determined using a configurable parameter that:

scales the total number of documents as a proportion of a size of the set of unlabeled documents; and defines a ratio of the number of confident documents to the number of non-confident documents to be within a predefined range.

17. The computer-implemented method according to claim 16, wherein the training set of documents comprise annotations of the documents of the training set of documents that are usable as ground truth labels.

18. The computer-implemented method according to claim 17, wherein the annotations of the documents are provided by at least one human.

19. The computer-implemented method according to claim 16, further comprising:

training a global classifier model based on documents from at least one set of representative documents of a final level of the ordered plurality of levels to obtain a trained global classifier, wherein the at least one set of representative documents comprises the plurality of confident documents and the plurality of non-confident documents; and labeling, using the trained global classifier model, samples of the set of unlabeled documents.

20. The computer-implemented method according to claim 16, wherein the predicted cluster probability vector comprises a length, m, where m is an integer in a range of five to one hundred, wherein the probability threshold is at least 0.8 and the consistency threshold is at least 60%.

* * * * *